United States Patent [19]

Manno

[11] 4,212,172
[45] Jul. 15, 1980

[54] FIBERGLASS AIRCONDITIONER AIR PRE-COOLER

[75] Inventor: Anthony C. Manno, 8644 E. Bonnie Rose Ave., Scottsdale, Ariz. 85253

[73] Assignee: Anthony C. Manno, Scottsdale, Ariz.

[21] Appl. No.: 910,885

[22] Filed: Jun. 20, 1978

[51] Int. Cl.² ............................................. F28D 5/00
[52] U.S. Cl. ........................................ 62/305; 62/279
[58] Field of Search ............... 62/305, 262, 279, 280

[56] References Cited

U.S. PATENT DOCUMENTS

| | | | |
|---|---|---|---|
| 2,296,680 | 9/1942 | McLenegan | 62/305 |
| 2,333,374 | 11/1963 | Guthrie | 62/262 |
| 2,708,835 | 5/1955 | Nigro | 62/305 |
| 3,153,332 | 10/1964 | Goettl et al. | 62/305 |
| 3,313,120 | 4/1967 | Kuss et al. | 62/305 |
| 3,872,684 | 3/1975 | Scott | 62/305 |
| 3,926,000 | 12/1975 | Scofield | 62/305 |
| 3,984,906 | 10/1976 | Starr et al. | 62/305 |
| 4,028,906 | 6/1977 | Gingold et al. | 62/305 |

*Primary Examiner*—Lloyd L. King

[57] ABSTRACT

This is an electrical energy saving device made of fiberglass to cool the air that cools the condenser coils of an air conditioner on a home or building. This is achieved by cooling the air with water and then filtering the moisture from the air before the air passes through the air conditioner condenser coils. The water draining from the evaporator coils is also used to cool the air.

4 Claims, 4 Drawing Figures

FIBERGLASS AIRCONDITIONER AIR PRE-COOLER

DESCRIPTION OF THE PRIOR ARTS

In many areas of the United States where air conditioners are used to cool homes and businesses, the humidity in the air is low causing an air conditioner unit to work hard to cool a given air space. Adding moisture to the air by using water to cool the air such as in pre-cooler wil increase the efficiency of the air conditioner. Water is used in prior arts and present pre-cooler because of its availability, cost and controllability.

In many prior arts water or water droplets come in contact with the metal parts of the air conditioner, which in time may cause deterioration and or rust, reducing the efficiency of the air conditioner. For this reason it is improtant to keep water or water droplets from coming in contact with the condenser coil and other parts of the unit. The present invention has a filter to prevent the above condition.

Prior arts use pumps, flow control valves, pressure and temperature sensing devices, float valves and cloth bags to control the flow of water. In the present art a plastic spray head alone is used eliminating the possibility of maintenance.

SUMMARY

This apparatus improves the efficiency of an air conditioner thus saves electricity by water running down an incline so turbulent air can pick up moisture which cools the air, and then filtering the moisture to protect the condenser coils. The water from the filter is drained to the bottom of the pre-cooler and out the drain. The solenoid is used as automatic on-off valve. The water from the evaporator coils is drained to the bottom of the pre-cooler to cool the water in the reservoir which cools the lower portion of the condenser coils, then out the drain.

DRAWING REFERENCE

Figure 1:
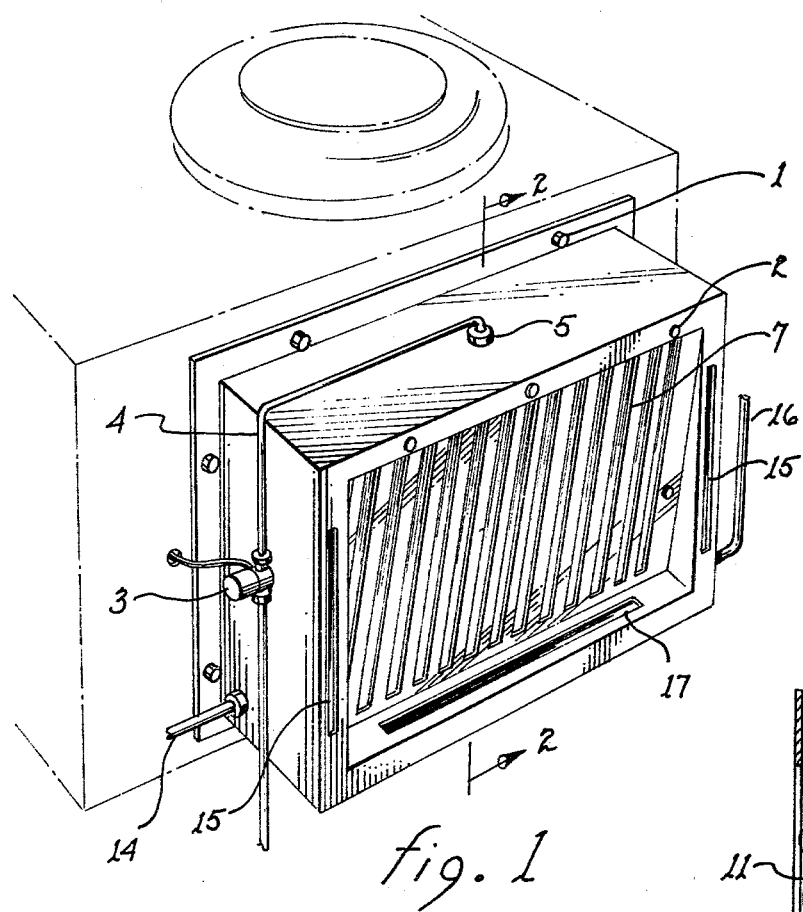
FIG. 1 Shows the pre-cooler mounted on an air conditioner.

FIG. 1 is showing the front view with 1 being mount screws to the air conditioner. 2 being the plastic snaps holding the water vanes in place. 3 is the electrical solenoid to control water flow, on or off. 4 is the plastic line from the solenoid to the plastic bulkhead fitting 5. 7 is the water vanes. 14 is the water drain line. 15 are side air slots. 16 is the water drain line from the evaporator coils of the air conditioner to the pre-cooler. 17 is the lower air slot to the reservoir.

Figure 2:
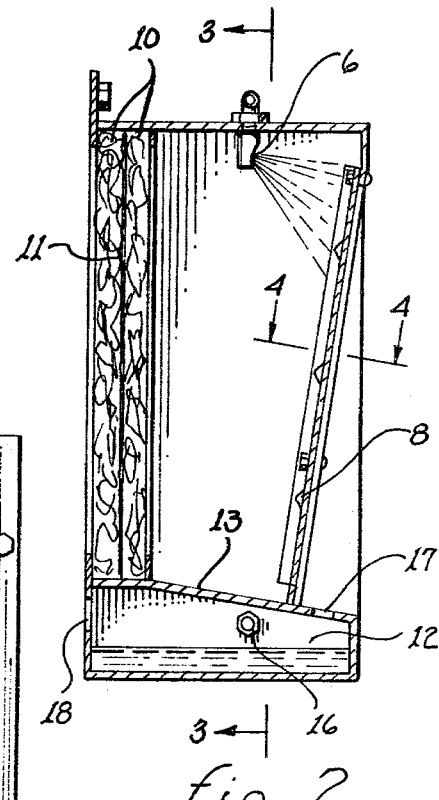
FIG. 2 Shows a side view of the arrangement of internal parts.

FIG. 2 shows the cross section of the pre-cooler with 6 being the plastic spray nozzle spraying water to the water vanes. 8 is the raised portions of the water vanes used to produce a water falls. 10 are the fiber filters and 11 is the nylon material between them preventing droplets of water reaching the condenser coil of the airconditioner. 12 is the reservoir area which holds a pre-determined amount of water. 13 is the water ramp draining the excess water from the filters to the reservoir. 16 is the plastic fitting attaching the line from the evaporator coil to the pre-cooler. 17 is that air slot to the reservoir and 18 is the air slot from the reservoir to the condenser coils.

Figure 3:
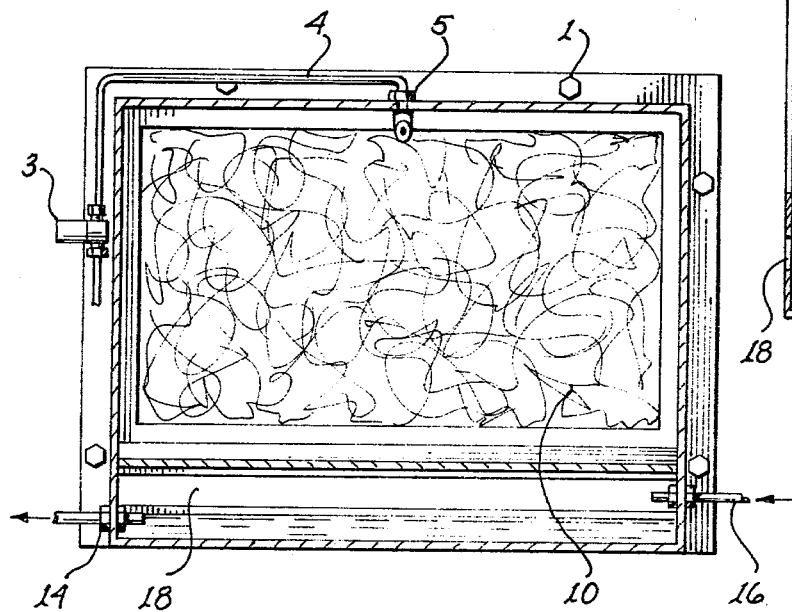
FIG. 3 Shows rear view of internal parts.

FIG. 3 shows a cross section of front view with 1 being the mount screws of the pre-cooler to the airconditioner. 3 is the solenoid controlling water flow. 4 is the plastic line from the solenoid to the plastic bulkhead 5. 10 is the fiber filter, filtering the droplets of water from the air. 14 is the plastic drain and fitting controlling the level of the reservoir. 16 is the plastic line from the condenser coils to the pre-cooler. 18 is the air slot from the reservoir to the condensor coil of the airconditioner.

Figure 4:
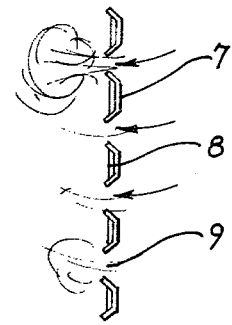
FIG. 4 Shows the design of the water vanes.

FIG. 4 shows the corss section of the water vanes with 7 being the water vanes. 8 is the raised portion of the vanes causing a water falls. 9 is the slot in the vanes letting the air into the pre-cooler.

In FIG. 1 is the front view showing the outer casing which has four sides, is made of fiberglass. Also seven in FIGS. 1 and 4 are the water vanes made of fiberglass. In FIG. 2, 13 being the water ramp is made of fiberglass also. The fiberglass feature is for rust prevention, durability, and resistance to heat and cold.

In FIG. 1 is the front view of the pre-cooler with 1 being screws on the mounting flange to mount the cooler on the air conditioner. 2 are plastic snaps to hold the water vanes 7 in place. 3 is the solenoid which controls the on-off flow of water automatically which is wired electrically to any of the most convenient circuits available in the air conditioner. When the air conditioner starts the solenoid is automatically set to open position. When the air conditioner stops the solenoid is returned to closed position. A plastic water line 4 FIGS. 1 and 3 is connected to plastic bulkhead fitting 5 FIGS. 1 and 3 screwed on to the top of the unit which the spray nozzle 6 FIG. 2 is attached.

The rate of water flow is controlled by the size of hole in the spray nozzle 6 FIG. 2. The water spray is directed to the top of the water vanes in 7 FIGS. 1 and 4 and runs down the vanes over the raised portions 8 (FIGS. 2 & 4) of the water vanes so turbulent air coming through the slots can pick up water droplets of water to the fiber filter 10, FIGS. 2 and 3, which is laminated and has a nylon material 11, FIG. 2, in between them acting as a moisture barrier to collect any possible moisture from coming in contact with condenser coils. As moisture builds up on the filter 10 the air is cooled again. The excess water is drained down ramp 13, FIG. 2, and into the reservoir 12, FIG. 2. The fiber filter assembly is placed against the condenser coils for greater efficiency of the cool air. The closer the moist air is to the condenser coils the cooler the air is, passing through the coils.

The reservoir area 12 FIG. 2 at the lower portion of the apparatus being used to cool the lower portion of the condenser coils, is used for continuous cooling of the condenser coils of an air conditioner operating or not. Water from the evaporator coils is drained through a plastic pipe and fitting 16, FIGS. 1, 2 and 3 to the bottom of the unit to cool the water in the reservoir 12, FIG. 2.

The drain 14, FIGS. 1 and 3 being used to control the water level in the reservoir to a specified height.

In FIG. 1 slots 15 on each side are for additional air flow through the unit to relieve strain on condenser fan motor. The slot 17, FIGS. 1 and 2 at the bottom, lets air flow over the cool water and out through the opening 18, FIGS. 2 and 3 cools the bottom portions of the condenser coils.

The apparatus painted white covering the air conditioner condenser coils protects the coils from the sun heat and rays.

The apparatus increases the efficiency of the air conditioner which reduces running time of the compressor motor, condenser motor and evaporator motor.

I claim

1. An apparatus for cooling the condensor coils of an air condltioning system comprising an evaporator, compressor and condensor, said apparatus having four sides, a front and a rear, fiberglass vane means located on the front, said vane means being so arranged as to provide moisture pick up by turbulent air thus cooling such air, a laminated fiber filter assembly filled with nylon material for separating the moisture from the air and protecting the condensor coils, said filter assembly located on the rear of the apparatus against the condensor coils, a plastic spray nozzle mounted above the vanes for directing cooling water on to the interior of the vanes, a fiber glass water ramp located at the bottom of the vanes and the filter assembly, a reservoir mounted below the ramp for collecting the water flowing from the filter assembly, drain means in said reservoir for controlling the water level, said apparatus increasing the efficiency of the air conditioning system by reducing the running time of the compressor and the condensor and evaporator fan motors, a solenoid used to control the flow of water.

2. The apparatus as recited in claim 1 wherein the sides, vane front and water ramp are all constructed from fiberglass, for its corrosion resistance and resistance to heat and cold.

3. The apparatus as recited in claim 1 wherein all plastic fittings are used.

4. The apparatus as recited in claim 1 wherein the lower portion of the condensor coils is used for continous cooling of the condensor coils of the air conditioner either operating or not, the reservoir also being used as a collector for water from the evaporator coils.

* * * * *